ary 9, 1989

United States Patent [19]
Borth et al.

[11] Patent Number: 4,829,543
[45] Date of Patent: May 9, 1989

[54] PHASE-COHERENT TDMA QUADRATURE RECEIVER FOR MULTIPATH FADING CHANNELS

[75] Inventors: David E. Borth, Palatine; Chih-Fei Wang, Arlington Heights; Duane C. Rabe, Rolling Meadows; Gerald P. Labedz, Chicago, all of Ill.

[73] Assignee: Motorola, Inc., Schaumburg, Ill.

[21] Appl. No.: 128,976

[22] Filed: Dec. 4, 1987

[51] Int. Cl.[4] .......................................... H04L 27/22
[52] U.S. Cl. ........................................ 375/83; 375/96; 329/112
[58] Field of Search ....................... 375/1, 115, 96, 39, 375/77, 83; 364/604, 728, 819; 329/104, 112, 110; 370/104

[56] References Cited

U.S. PATENT DOCUMENTS

| | | | |
|---|---|---|---|
| 4,475,214 | 10/1984 | Gutleber | 375/96 |
| 4,484,335 | 11/1984 | Mosley et al. | 375/96 |
| 4,575,861 | 3/1986 | Leureault | 375/115 |
| 4,587,662 | 5/1986 | Langewellpott | 375/1 |
| 4,606,051 | 8/1986 | Crabtree et al. | 375/86 |
| 4,633,426 | 12/1986 | Venier | 375/96 |
| 4,669,091 | 5/1987 | Nossen | 375/14 |
| 4,669,092 | 5/1987 | Sari et al. | 375/14 |
| 4,672,638 | 6/1987 | Taguchi et al. | 375/99 |
| 4,691,326 | 9/1987 | Tsuchiya | 375/1 |

FOREIGN PATENT DOCUMENTS 0174125 3/1986 European Pat. Off. .
01840118 6/1986 European Pat. Off. .

OTHER PUBLICATIONS

Andreas Polydoros, "A Unified Approach to Serial Search Spread Spectrum Code Acquisition"—Part II, A Match Filter Receiver, IEEE Transaction, vol. Com 32, No. 5, May 1984.
Price et al.; "A Communication Technique for Multipath Channels", Proceedings of the IRE; vol. 46, Mar. 1958; pp. 555-570.
Turin; "Introduction to Spread-Spectrum Antimultipath Techniques and their Application to Urban Digital Radio", Proceedings of the IEEE; vol. 68, No. 3, Mar. 1980; pp. 328-353.
Eckert et al.; "The Fully Digital Cellular Radiotelephone System CD900"; Nordic Seminar on Digital Land Mobile Radiocommunication; Feb. 5-7, 1985, Espoo, Finland; pp. 249-259.
Langewellpott et al.,; "Performance Analysis of Radio Transmission in the Fully Digital Cellular Radio System CD900"; Nordic Seminar on Digital Land Mobile Radiocommunications; Feb. 5-7, 1985, Espoo, Finland; pp. 261-269.
Leuenberger; "Digital Radio Systems Examined-Part I, General State of the Art"; MSN & CT; vol. 16, No. 1; Jan. 1986; pp. 81-92.
Raith et al.; "Multi-Path Equalization for Digital Cellular Radio Operating at 300 KBit/S"; 36th IEEE VTG Conference, Jun. 1986; pp. 268-272.
Inmos; "Cascadable Signal Processor TMS A100"; Catalog Sheet, Jul. 1986.
Stjernvall et al., "Radio Test Performance of a Narrowband TDMA System"; 37th IEEE VTG Conference; Jun. 1-3, 1987; pp. 293-299.
Stjernvall et al.; "Radio Test Performance of a Narrowband TDMA System-DMS 90"; International Conference on Digital Land Mobile Radio Communications; Venice; Jun. 30-Jul. 3, 1987; pp. 310-317.
Kammeyer; "Equalization Problems in a Digital FM Receiver"; Signal Processing vol. 9, No. 4; Dec. 1985; pp. 263-276.

*Primary Examiner*—Robert L. Griffith
*Assistant Examiner*—Stephen Chin
*Attorney, Agent, or Firm*—Raymond A. Jenski; Rolland R. Hackbart

[57] ABSTRACT

A method and apparatus for phase-coherently demodulating a multipath-impaired time division multiple access QPSK data timeslot is disclosed. A quadrature separator generates multipath-impaired intermediate signals which, during a predetermined synchronizing sequence for the timeslot, are applied to a pair of synchronizing correlators to generate quadrature multipath profiles. These profiles then are used to modify subsequently received QPSK timeslot signals at the separator outputs to coherently construct multipath compensated I and Q channel data.

14 Claims, 5 Drawing Sheets

PHASE-COHERENT TDMA QUADRATURE RECEIVER FOR MULTIPATH FADING CHANNELS

BACKGROUND OF THE INVENTION

This invention relates generally to digital radio receivers and more specifically to receivers receiving and demodulating TDMA QPSK modulation in a multipath fading environment such as an environment where the receivers may be in motion. This invention is related to instant assignee's U.S. patent applications "Rapid Reference Acquisition and Phase Error Compensation for Radio Transmission of Data", filed on behalf of Labedz et al. and "TMDA Radio System Employing BPSK Synchronization for QPSK Signals Subject to Random Phase Variation and Multipath Fading", filed on behalf of Borth et al. on the same date as the present invention and containing related subject matter.

In a typical environment, a UHF or microwave radio channel exhibits a multipath structure in addition to Rayleigh fading. Thus, a radio receiver for a mobile or portable TDMA system operating at high speed data rates must accommodate reception of multiple replicas of the transmitted signal, each with a random magnitude, phase, and time delay with respect to the transmitted signal. Without corrective measures, the data message can be obliterated by the multipath signals. As early as 1958, a receiver capable of accommodating these impairments was described for the use of either Differential Binary Phase-Shift Keying (DBPSK) or noncoherent Frequency-Shift Keying (FSK). It employed a channel sounding method to estimate the channel impulse response or channel profile, and a transversal equalizer having taps which were adjusted in response to the estimated channel profile. By 1960 the multipath channel had been exhaustively studied and simulated, and optimum reception had been defined, but largely avoiding phase coherent techniques. Such demodulation techniques do not permit the use of higher spectral efficiency modulation methods which employ two-dimensional signaling techniques such as shaped Quadrature Phase-Shift Keying (QPSK) and its variations.

By 1983, TDMA (Time Division Multiple Access) receivers for digital telephony using Binary Phase-Shift Keying (BPSK) phase coherent detection had been described in U.S. Pat. No. 4,587,662. In 1985 this was extended to include QPSK, but the receiver was only described in general terms.

In 1986 an MSK receiver, with possible application to QPSK, was reported which could accommodate two rays of multipath and which used an adaptive equalizer employing both feedforward and feedback filtering. (See Krister Raith et al., "Multi-Path Equalization for Digital Cellular Radio Operating at 300 kbits/s", 36th IEEE Vehicular Conference, pp. 268≧272, May 1986). Although this adaptive equalizer apparently has never been thoroughly described in the literature, it is different than the multipath correlation employed in the present invention since it requires decisions to be made on the output in order to adjust the equalizer.

Adaptive equalization generally operating continuously on the data being received has been utilized in digital microwave receivers receiving continuous data streams. Such continuous receivers can equalize over a relatively long period of time. TDMA, due to its burst-like characteristics, demands rapid determination of the channel profile including the significant multipath contributions. Even though the data receiver may be moving, the channel profile can be assumed to undergo negligible changes in a given TDMA timeslot if the timeslot is sufficiently short in duration.

SUMMARY OF THE INVENTION

Therefore, it is one object of the present invention to compensate for multipath distortion introduced by a radio channel to transmitted digital information.

It is another object of the present invention to create a channel profile to adapt the receiver demodulator to correct for the multipath distortion.

It is a further object of the present invention to create the radio channel multipath profile model from a synchronization sequence transmitted during part of one timeslot of a TDMA transmission and utilize that model during the entire timeslot period.

Accordingly, these and other objects are achieved in the present invention which encompasses a time division multiple access (TDMA) radio system receiver which utilizes a synchronizing sequence contained within an assigned timeslot of message data to adapt a multi-phase demodulator to the finite impulse response of the radio channel during the assigned timeslot. A first phase of the synchronizing sequence is correlated to a predetermined sequence to create a first correlator signal. Likewise, a second phase of the synchronizing sequence is correlated to the predetermined sequence to create a second correlator signal. The first and second correlator signals are then correlated with first and second phases of received message data and the resulting outputs of correlation are combined to yield first and second phase data.

DESCRIPTION OF THE PREFERRED EMBODIMENT

Figure 1:
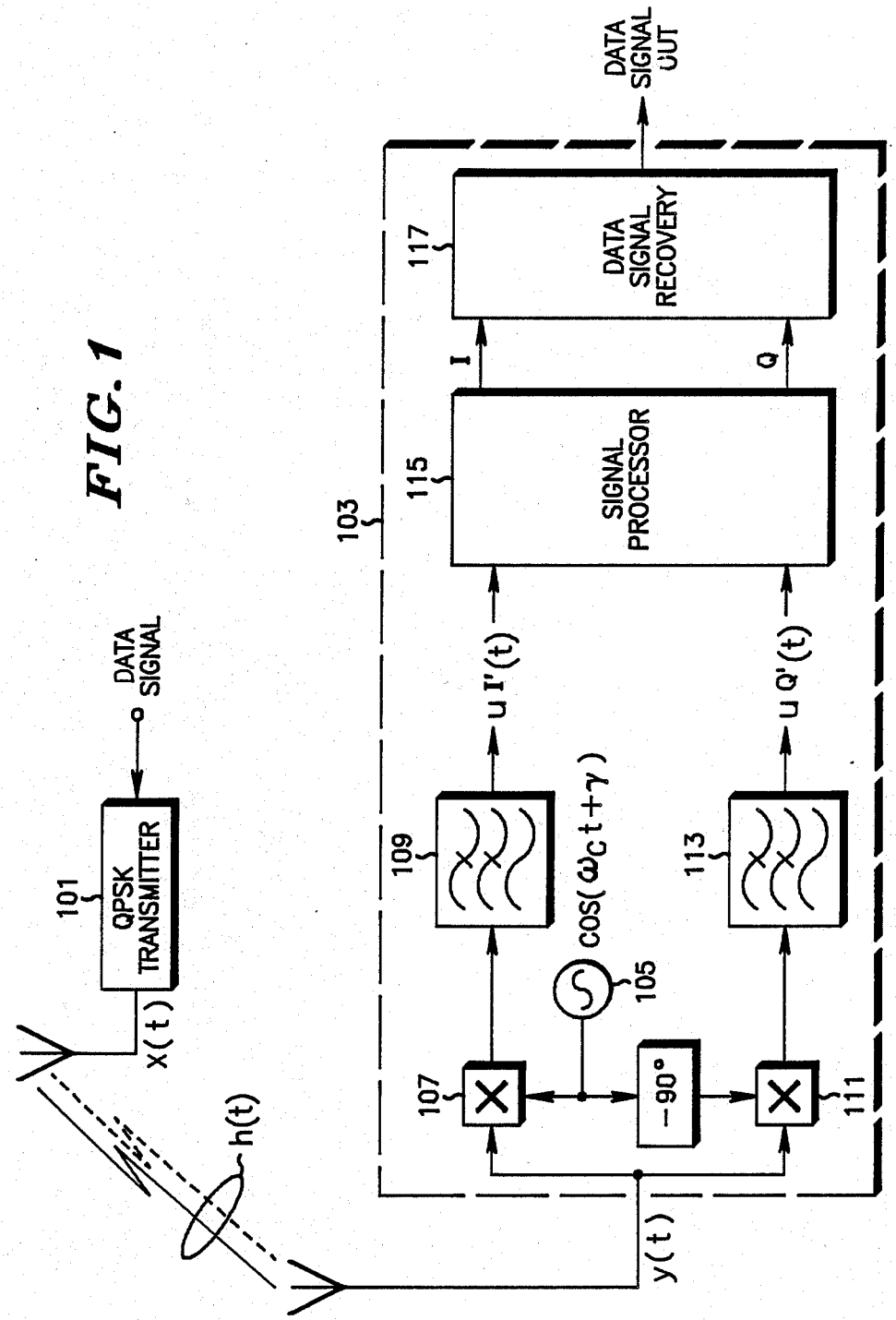
FIG. 1 is a block diagram of a data transmission system employing quadrature digital transmission and reception.

A radio frequency system conveying a data system from a transmitter 101 to a receiver 103 is shown in FIG. 1. In the preferred embodiment, quadrature phase shift keying (QPSK) is employed to increase the throughput of the channel although other multi-dimensional signaling may equivalently be employed. Further, the well-known time division multiple access (TDMA) technique of sharing a limited channel resource among a large number of users is employed in the present invention. Each of the users is assigned a brief period of time (a timeslot) during which a message may be transmitted to or received from the user. The advantages of such a TDMA technique over other techniques (such as frequency division multiple access TDMA) are: (a) no duplexer is required for full duplex communications, (b) variable data rate transmission may be accommodated through the use of multiple adjacent time slots, (c) a common radio frequency power amplifier may be used to amplify multiple channels at any power level without the combining losses or intermodulation distortion present with FDMA, and (d) a capability of scanning other "channels" (timeslots) without requiring separate receivers may be provided.

The high data rate employed in the present invention (200 Kbps to 2 Mbps) exceeds the channel coherence bandwidth of the mobile radio channel for many urban and suburban environments. As a result, the channel exhibits a multipath structure in addition to the expected Rayleigh fading. The receiver of the present invention enables TDMA quadrature signals to be coherently received over a multipath fading channel. This embodiment will demodulate a 2-megachip/sec QPSK radio signal, the only constraint being that the acquisition sequence be transmitted as a binary phase shift keying (BPSK) signal with a predetermined phase relative to the QPSK data.

Figure 2A:
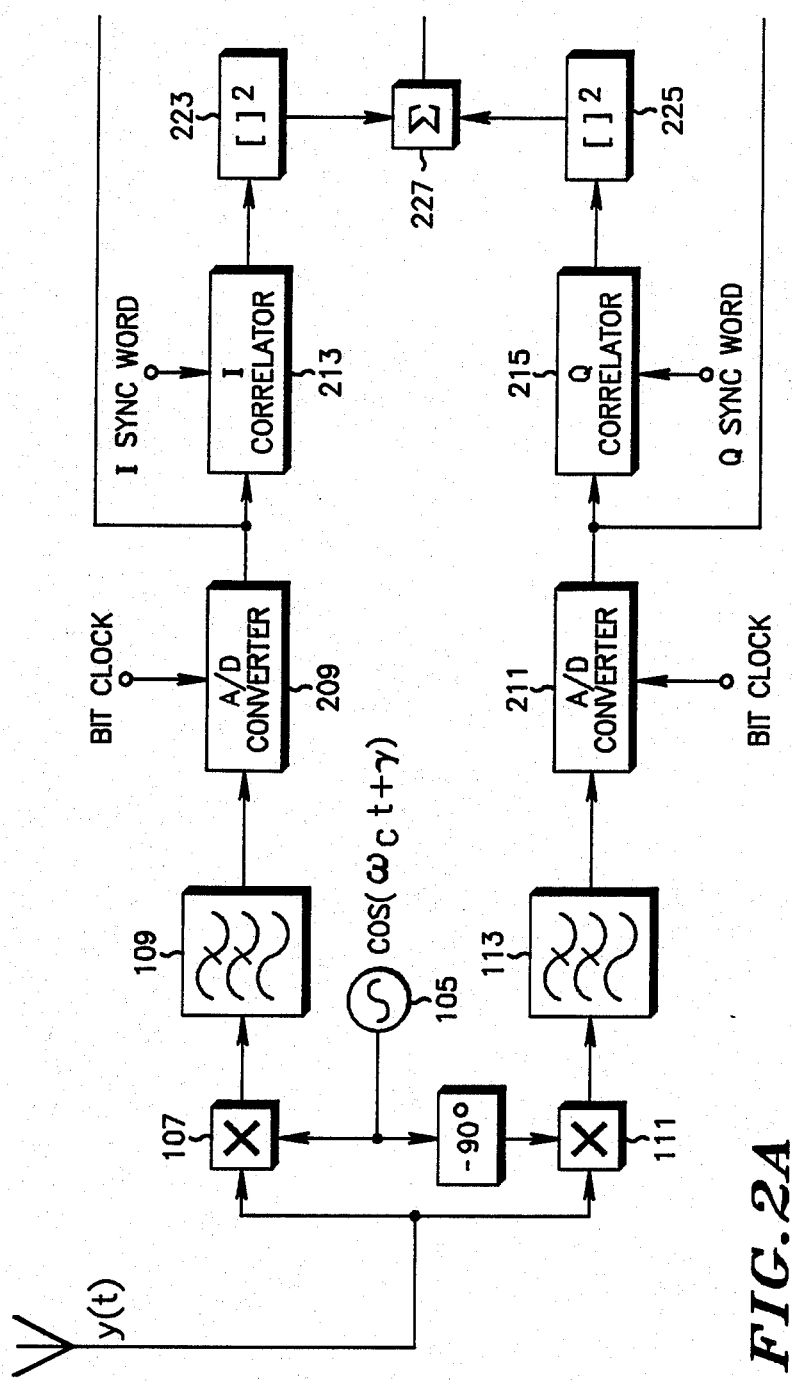
FIGS. 2A and 2B are, together, a block diagram of a TDMA receiver which may receive QPSK signals.
Figure 2B:
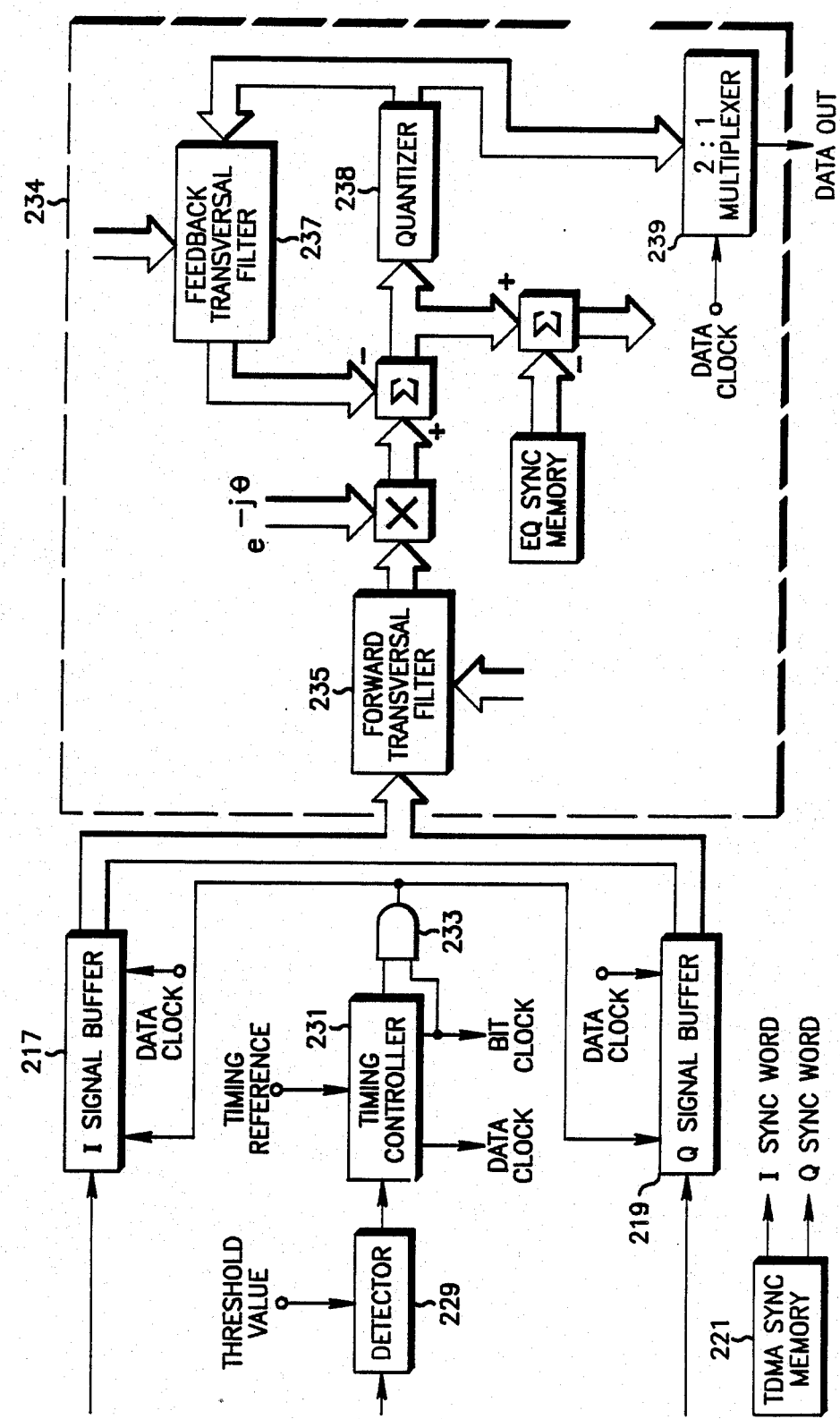

FIGS. 2A and 2B are a block diagram of a TDMA receiver which may be employed to recover TDMA quadrature phase shift keying data and is described in instant assignee's U.S. Pat. application No. 009,973 "TDMA Communications System with Adaptive Equalization" filed on Feb. 2, 1987 on behalf of David E. Borth and is incorporated by reference herein.

The digital signal outputs of the A/D converters 209 and 211, respectively, are applied to in-phase (I) time slot correlator 213 and quadrature (Q) correlator 215, respectively, as well as to their respective signal buffers 217 and 219. I correlator 213 performs a correlation function between all received bits of the input signal and a pre-loaded synchronization word (I sync word) corresponding to the in-phase time slot sync word.

The output of I correlator 213 is a digital bit stream representing the sample-by-sample correlation of the received data with the stored synchronization word replica for the timeslot. The correlation function exhibits a peak when the I sync word is located in the received sample data. In the same way, Q correlator 215 performs a correlation function between the pre-stored quadrature Q sync word from memory 221 and the sampled quadrature (Q) input.

The outputs of correlators 213 and 215 are applied to squaring blocks 223 and 225, respectively. The squaring block output signals represent the squared values of the separate I and Q correlation operations respectively. The squaring block outputs are then applied to summing block 227. The I and Q correlation signals are summed together to form a squared envelope signal which represents the sum of squares of the correlation signal. The squared envelope of the correlation signal makes an explicit determination of the phase ambiguity unnecessary. This, without resolving any ambiguity, a large amplitude signal output from summing block 227 represents a possible start location for a particular timeslot.

The output of summing block 227 is then routed to time slot detector 229, wherein the summed correlation signal is compared with a predetermined threshold value. This threshold value represents the minimum allowable correlation value which would represent a detected timeslot. If the summed output is greater than the threshold value, a time slot detect signal is generated and applied to system timing controller 231.

Timing controller 231 functions as a phase-locked loop (PLL), using a stable timing reference to validate the timeslot detect signal and provide a validated detect output signal. The validated timeslot detect signal is applied to AND gate 233 along with a bit clock output. The combined timeslot detect/bit clock signal is then routed to the I and Q signal buffers 217 and 219, respectively. Data signals are clocked into signal buffers 217 and 219 using the combined detect/bit clock signal.

In the implementation shown in FIGS. 2A and 2B, a conventional baseband synchronous decision feedback equalizer (DFE) 234 is employed for data signal recovery. The DFE 234 basically consists of two parts: a forward linear transversal filter 235 and a feedback linear transversal filter 237. The forward filter 235 attempts to minimize the mean-square-error (MSE) due to intersymbol interference (ISI), while the feedback filter 237 attempts to remove the ISI due to previously detected symbols.

The decision feedback equalizer 234 structure is adapted at least once each time slot in order to compensate for the effects of the time-varying multipath profile. The equalized and quantized complex data output from quantizer 238 is applied to multiplexer 239 for 2:1 multiplexing together with the data clock and output as an output data word.

Returning to FIG. 1, in a QPSK communication system, a transmitted signal x(t) may be expressed as:

$$x(t) = a(t) \cos \omega_c t + b(t) \sin \omega_c t \qquad (1)$$

where a(t) and b(t) are the in-phase and quadrature information signals and $\omega_c$ is the carrier frequency of the QPSK signal in radians/sec.

A frequency-selective (ior delay-spread) channel that is, a radio channel subject to multipath interference, may be characterized by an equivalent channel impulse response given by:

$$h(t) = \alpha_0 \delta(t - \tau_0) + \alpha_1 \delta(t - \tau_1) + \alpha_2 \delta(t - \tau_2) + \ldots = \sum_{i=0}^{m} \alpha_i \delta(t - \tau_i); \qquad (2)$$

where $\alpha_i$ is the amplitude of the i-th resolvable path, $\tau_i$ is the (excess) path delay associated with the i-th resolvable path, and m+1 is the total number of resolvable paths.

For a channel input given by equation (1), the output of the equivalent delay-spread channel having the impulse response of equation (2) is essentially constant during any given timeslot, and given by:

$$
\begin{aligned}
y(t) &= x(t) * h(t) = \int_{-\infty}^{\infty} x(\tau) h(t - \tau) d\tau^* = \\
&\quad \int_{-\infty}^{\infty} x(\tau) \sum_{i=0}^{m} \alpha_i \delta(t - \tau - \tau_i) d\tau \\
&= \sum_{i=0}^{m} \alpha_i \int_{-\infty}^{\infty} x(\tau) \delta(t - \tau - \tau_i) d\tau \\
&= \sum_{i=0}^{m} \alpha_i x(t - \tau_i) \\
&= \sum_{i=0}^{m} \alpha_i [a(t - \tau_i) \cos \omega_c (t - \tau_i) + b(t - \tau_i) \sin \omega_c (t - \tau_i)].
\end{aligned} \qquad (3)
$$

It is this signal, y(t), which is input to receiver 103. When the local oscillator reference 106 in the receiver has a phase offset of $\gamma$ with respect to the (direct-path) received QPSK transmission, the receiver local oscillator reference may be given by $\cos(\omega_c t + \gamma)$ and is essentially constant during a TDMA timeslot. (Although the antenna is shown connected to the mixers 107 and 111, it is likely that additional signal processing will be required for higher frequency radio signals. If down-conversion to an intermediate frequency is used, the output frequency of local oscillator may be different). Let UI(t) denote the output of the mixer 107 in the uncorrected in-phase branch of the receiver and let UI'(t) denote the low-pass filtered version of UI(t) output from low pass filter 109. Similarly, let UQ(t) denote the output of the mixer 111 in the uncorrected quadrature phase branch of the receiver and let UQ'(t) denote the low-pass filtered version of UQ(t) from filter 113. UI'(t) and UQ'(t) are subsequently input to signal processor 115 for resolution into I and Q data and then coupled to data signal recovery 117.

UI(t) is given by:

$$UI(t) = \cos(\omega_c t + \gamma) \sum_{i=0}^{m} \alpha_i [a(t - \tau_i)\cos\omega_c(t - \tau_i) + b(t - \tau_i)\sin\omega_c(t - \tau_i)] \quad (4)$$

$$= \sum_{i=0}^{m} \alpha_i [(\tfrac{1}{2})a(t - \tau_i)(\cos\{\gamma + \omega_c\tau_i\} + \cos\{2\omega_c t + \gamma - \omega_c\tau_i\}) + (\tfrac{1}{2})b(t - \tau_i)(\sin\{2\omega_c t + \gamma - \omega_c\tau_i\} - \sin\{\gamma + \omega_c\tau_i\})].$$

The low-pass filtered version UI'(t) of UI(t) is given by:

$$UI'(t) = \sum_{i=0}^{m} (\tfrac{1}{2})\alpha_i [a(t - \tau_i)\cos(\gamma + \omega_c\tau_i) - b(t - \tau_i)\sin(\gamma + \omega_c\tau_i)]. \quad (5)$$

Similarly UQ(t) is given by:

$$UQ(t) = \sin(\omega_c t + \gamma) \sum_{i=0}^{m} \alpha_i [a(t - \tau_i)\cos\omega_c(t - \tau_i) + b(t - \tau_i)\sin\omega_c(t - \tau_i)] \quad (6)$$

$$= \sum_{i=0}^{m} \alpha_i [(\tfrac{1}{2})a(t - \tau_i)(\sin\{2\omega_c t + \gamma - \omega_c\tau_i\} + \sin\{\gamma + \omega_c\tau_i\}) + (\tfrac{1}{2})b(t - \tau_i)(\cos\{\gamma + \omega_c\tau_i\} - \cos\{2\omega_c t + \gamma - \omega_c\tau_i\})]$$

and UQ'(t) is given by:

$$UQ'(t) = \sum_{i=0}^{m} (\tfrac{1}{2})\alpha_i [a(t - \tau_i)\sin(\gamma + \omega_c\tau_i) + b(t - \tau_i)\cos(\gamma + \omega_c\tau_i)]. \quad (7)$$

Considering the operation of the present invention in mathematical form, it is an important feature that the transmitted signal $x_T(t)$ during the synchronization (or training) phase of the equalizer 115 is a BPSK signal. When transmitted in the I phase it is given by:

$$x_T(t) = a_T(t)\cos\omega_c t \quad (8)$$

where signal $a_T(t)$ (not shown) is a predetermined synchronization sequence with good aperiodic autocorrelation properties, such as one of the Barker sequences.

The uncorrected in-phase and quadrature receiver branch outputs corresponding to the synchronizing transmitted signal $x_T(t)$ may be found by substituting the signal of equation (8) in the received and low pass filtered signals UI'(t) and UQ'(t) of equations (5) and (7) respectively, yielding:

$$UI'_T(t) = \sum_{i=0}^{m} (\tfrac{1}{2})\alpha_i [a_T(t - \tau_i)\cos(\gamma + \omega_c\tau_i)] \quad (9)$$

and, $$UQ'_T(t) = \sum_{i=0}^{m} (\tfrac{1}{2})\alpha_i [a_T(t - \tau_i)\sin(\gamma + \omega_c\tau_i)]. \quad (10)$$

Thus UI'(t) and UQ'(t) are defined during the training phase as "T" as shown in equations (9) and (10).

Figure 3:
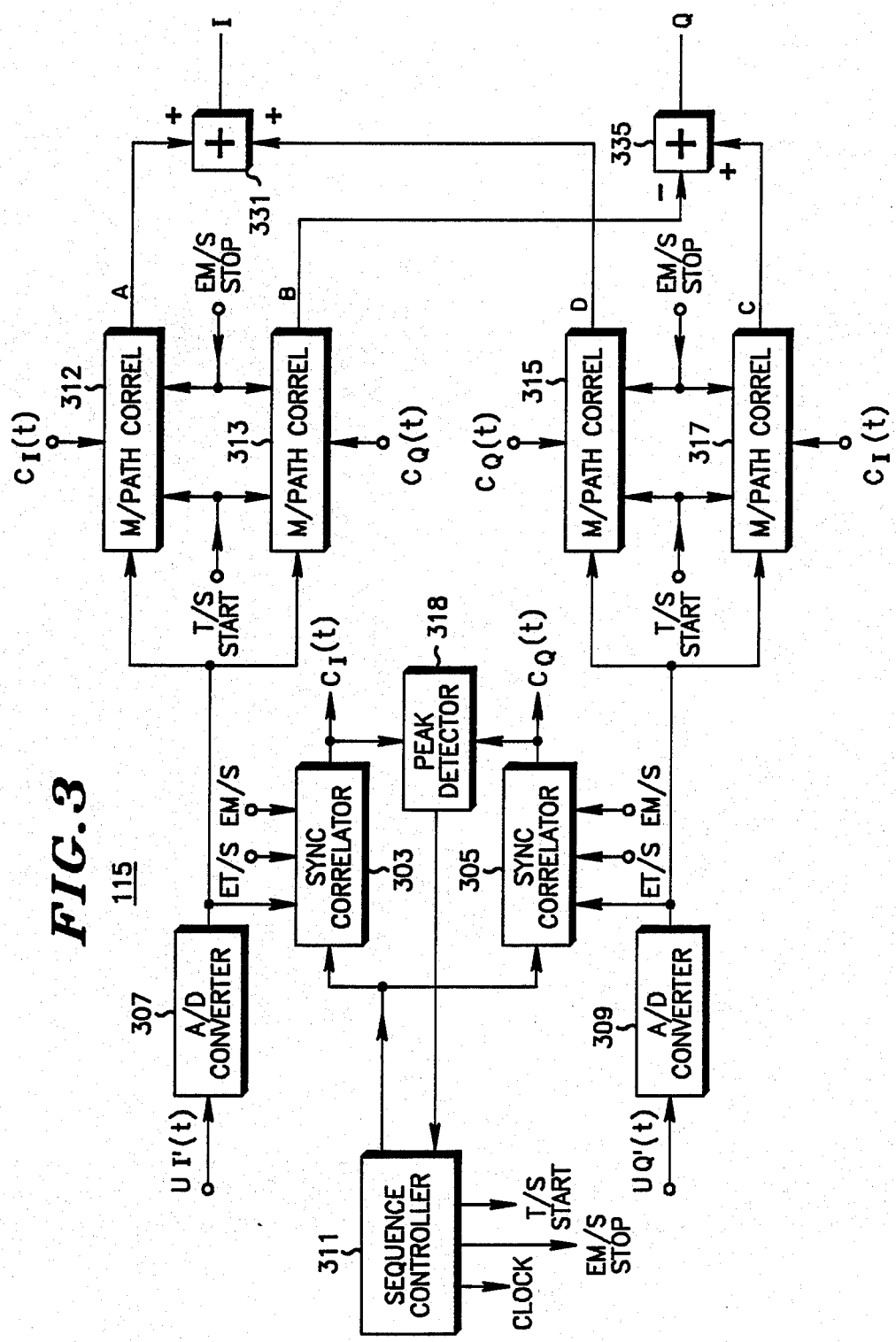
FIG. 3 is a block diagram of a TDMA receiver signal processor which may advantageously employ the present invention.
Figure 5:
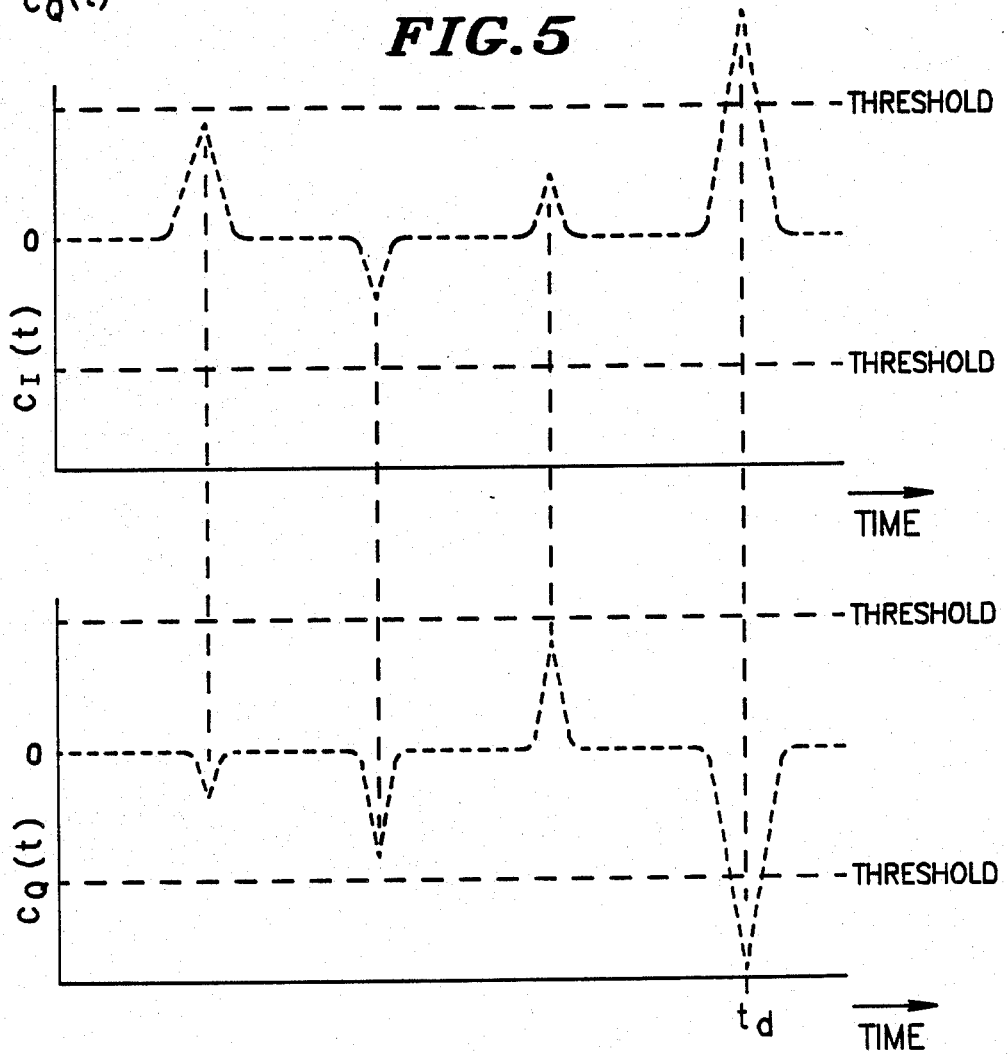
FIG. 5 is a graph of the synchronization correlator outputs $C_I(t)$ and $C_Q(t)$ plotted against time and showing a possible set of outputs including a correlation detection.

Referring now to FIG. 3 which illustrates the preferred embodiment of the present invention in block diagram form, the signals $UI'_T(t)$ and $UQ'_T(t)$ are applied to synchronization correlators (303 and 305, respectively) via conventional fast A/D converters 307 and 309. In the preferred embodiment, synchronization correlators 303, 305 are 4 by 32 bit digital finite impulse response (FIR) filters programmed to provide signed weighted correlation outputs. Synchronization correlators 303 and 305 are realized by an IMS A100 Cascadable Signal Processor available from Inmos Corp., Colorado Springs, Colo. The outputs of correlators $C_I(t)$ and $C_Q(t)$ which are, in simple terms, weighting factors for each i-th resolvable path, generated during reception of the acquisition sequence, may have the appearance as shown in FIG. 5 and are given by:

$$C_I(t) = \sum_{i=0}^{m} (\tfrac{1}{2})\alpha_i \cos(\gamma + \omega_c\tau_i)\delta(t - \tau_i) \quad (11)$$

and, $$C_Q(t) = \sum_{i=0}^{m} (\tfrac{1}{2})\alpha_i \sin(\gamma + \omega_c\tau_i)\delta(t - \tau_i). \quad (12)$$

The $\delta$ function in equations (11) and (12) determine when to sample the in-phase and quadrature receiver branch outputs and the $\alpha$ factor provides a weighting for each i-th resolvable pass contribution. In the preferred embodiment, a sequence controller 311 is realized using a conventional microprocessor (such as an MC68020 microprocessor available from Motorola, Inc.) and associated memory and timing dividers. The sequence controller 311 loads a predetermined normalized replica of the acquisition sequence (32 each 4-bit words) stored in the memory of sequence controller 311 into synchronization correlators 303 and 305 prior to the desired TDMA timeslot to be demodulated. TDMA frame timing is determined by the sequence controller 311 employing a conventional framing algorithm to confirm and maintain timeslot acquisition.

Synchronization correlators 303 and 305 each correlate the stored acquisition sequence against the last 32 received A/D samples, and for each new sample perform another complete correlation. While receiving noise or random data, the outputs $C_I(t)$ and $C_Q(t)$ of synchronization correlators 303 and 305 are small numbers of either polarity, emerging at the same rate as the A/D sampling rate (4 per chip interval). If the radio channel were free of noise and not degraded by multipath, then when an acquisition sequence has been received and digitized and entered into the correlators 303 and 305, $C_I(t)$ and $C_Q(t)$ would simultaneously manifest a pair (or sometimes two adjacent pairs) of signed numbers significantly larger than those produced by noise or random data, such that the root sum of squares of these numbers would be proportional to the magnitude of the received signal, and the phase angle $\gamma$ relative to the local reference oscillator is:

$$\gamma = \arctan [C_Q(t)/C_I(t)]. \tag{13}$$

In the presence of multipath, each significant path will result in the presence of such a peak pair appearing on $C_I(t)$ and $C_Q(t)$, the signs and magnitudes of each pair of outputs at each peak defining the delay, phase angle, and amplitude contribution of that path of the total, fulfilling the equations (11) and (12). Thus, each sequence of numbers $C_I(t)$ and $C_Q(t)$ are bipolar multipath channel profile estimates, which resemble a classic multipath channel profile, except that they are bipolar.

Figure 4:
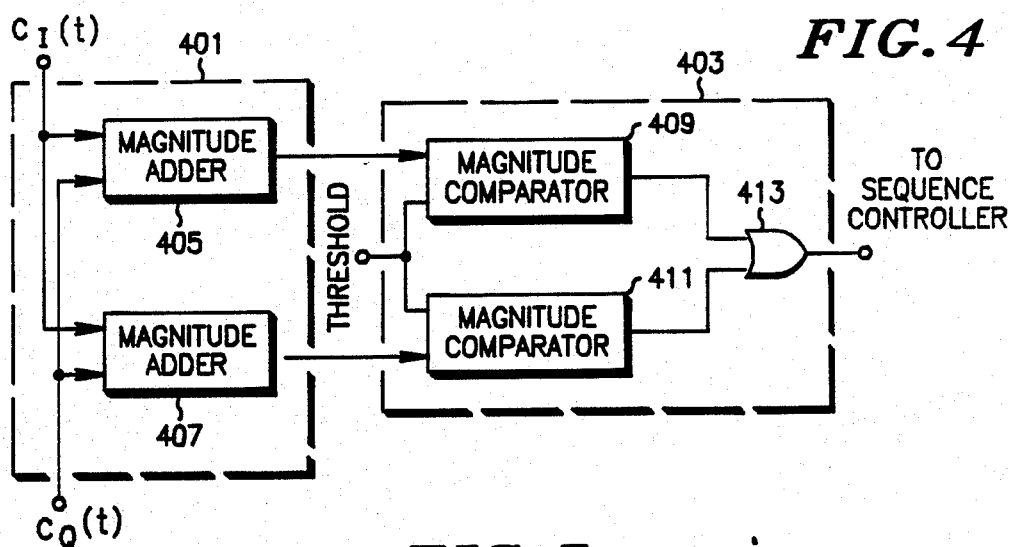
FIG. 4 is a block diagram of the peak detector circuit of the receiver of FIG. 3.

Each of the M/PATH correlators 312, 313, 315, and 317 are FIR filters of at least 32 taps. In the preferred embodiment, each M/PATH correlator is realized by an IMS A100 Cascadable Signal Processor (available from Inmos Corp., Colorado Springs, Colo.) conventionally connected as a correlator. During the acquisition sequence at the beginning of each desired timeslot, $C_I(t)$ is shifted into the TAP control entry of M/PATH correlators 312 and 317, and $C_1(t)$ is shifted into the TAP control entry of M/PATH correlators 313 and 315. Peak detector 318 is shown in FIG. 4 and comprises a root sum of squares approximator 401 and a threshold detector 403 having an output which signals the sequence controller 311 of the first significant ray of multipath. The sequence controller 311 then provides just enough additional reference port clocks to shift this peak all but through the M/PATH correlators, thereby capturing $C_I(t)$ and $C_Q(t)$ in their respective M/PATH correlators. In the preferred embodiment, the root sum of squares approximator 401 is realized employing a magnitude adder 405 which adds $|C_I(t)|$ and $(\frac{1}{2})|C_Q(t)|$ and magnitude adder 407 which adds $|C_Q(t)|$ and $\frac{1}{2}|C_I(t)|$. The outputs of magnitude adder 405 and magnitude adder 407 are input to conventional magnitude comparators 409 and 411, respectively, where the root sum of squares approximation is compared to a predetermined threshold to generate an output to the sequence controller 311 (via OR gate 413). This and other approximations to the square root of the sum of the squares may be found in, eg., A. E. Filip, "A Baker's Dozen Magnitude Approximations and Their Detection Statistics," IEEE Transactions on Aerospace and Electronic Systems, vol. AES-12, pp. 86–89, January 1976. This output to the sequence controller 311 is shown as $t_d$ in the example of FIG. 5. Thus, the peak detector 318 reports the first significant peak to the sequence controller 311 which, in turn, starts the loading at T/S stop, to thus capture the channel profile in each of the M/PATH correlators.

The four M/PATH correlators (312, 313, 315, and 317 in FIG. 3) thus have the information available to perform equations (14)–(17), below, whose results (A, B, C, and D) appear at the outputs of M/PATH correlators 312, 313, 315, and 317 respectively.

$$A = C_I(t)UI'(t) = \sum_{i=0}^{m} [(\tfrac{1}{2})a(0)\alpha_i^2\cos^2(\gamma + \omega_c\tau_i) - (\tfrac{1}{2})b(0)\alpha_i^2\cos(\gamma + \omega_c\tau_i)\sin(\gamma + \omega_c\tau_i)] \tag{14}$$

$$B = C_Q(t)UI'(t) = \sum_{i=0}^{m} [(\tfrac{1}{2})a(0)\alpha_i^2\cos(\gamma + \omega_c\tau_i)\sin(\gamma + \omega_c\tau_i) - (\tfrac{1}{2})b(0)\alpha_i^2\sin^2(\gamma + \omega_c\tau_i)] \tag{15}$$

$$C = C_I(t)UQ'(t) = \sum_{i=0}^{m} [(\tfrac{1}{2})a(0)\alpha_i^2\cos(\gamma + \omega_c\tau_i)\sin(\gamma + \omega_c\tau_i) + (\tfrac{1}{2})b(0)\alpha_i^2\cos^2(\gamma + \omega_c\tau_i)] \tag{16}$$

$$D = C_Q(t)UQ'(t) = \sum_{i=0}^{m} [(\tfrac{1}{2})a(0)\alpha_i^2\sin^2(\gamma + \omega_c\tau_i) + (\tfrac{1}{2})b(0)\alpha_i^2\cos(\gamma + \omega_c\tau_i)\sin(\gamma + \omega_c\tau_i)] \tag{17}$$

Properly combining the quantities A through D, one obtains the following expressions for the in-phase and quadrature outputs of the receiver at time $t=0$:

$$\begin{aligned} I = A + D &= \sum_{i=0}^{m} (\tfrac{1}{2})a(0)\alpha_i^2(\cos^2\{\gamma + \omega_c\tau_i\} + \sin^2\{\gamma + \omega_c\tau_i\}) \\ &= \sum_{i=0}^{m} (\tfrac{1}{2})a(0)\alpha_i^2 = \text{In-phase data.} \end{aligned} \tag{18}$$

$$\begin{aligned} Q = C - B &= \sum_{i=0}^{m} (\tfrac{1}{2})b(0)\alpha_i^2(\cos^2\{\gamma + \omega_c\tau_i\} + \sin^2\{\gamma + \omega_c\tau_i\}) \\ &= \sum_{i=0}^{m} (\tfrac{1}{2})b(0)\alpha_i^2 = \text{Quadrature-phase data.} \end{aligned} \tag{19}$$

Conventional adder 331 implements equation (18) to produce the recovered in-phase signal I and adder 335 implements equation (19) to produce the recovered quadrature signal Q, which are replicas of the transmitted I and Q channel data, respectively. The outputs I and Q are actually four sequential numbers per chip interval. It is possible to intergrate them and apply a simple threshold for a binary data stream, or to simply integrate them to provide relative weighting, both at the original rate, or to preserve their discrete sample form for use in somewhat more elaborate symbol or character correlation.

It can be seen by following the general input equation (3) through to equations (18) and (19) that the information contained in each of the paths of the multipath signal is *coherently* combined in the receiver, thereby permitting an effective time diversity gain in the receiver.

In the preferred embodiment four M/PATH correlators 312, 313, 315, and 317 operate on 128 samples, or 32 chip intervals so as to accommodate as much as an 8 microseconds variation in the path delays, any one with respect to the others. This also imposes the requirement that the acquisition sequence be of no less than 9 microseconds duration, preferably two to four times that long.

Although the transmission of the synchronization sequence in only the I channel is employed in the preferred embodiment, an identical utilization of only the Q channel for transmission of the synchronization sequence may easily be employed by one skilled in the art. Furthermore, it may be desirable to transmit the acquisition sequence at some other angle relative to I and Q, for example, simultaneously and identically in both I and Q for a 45° shift. Any angle can be accommodated by operating on the multipath profile estimates $C_I(t)$ and $C_Q(t)$ when applying them to M/PATH correlators.

The outputs I and Q from the adders 331 and 335 may subsequently be applied to a data signal recovery circuit such as the conventional baseband synchronous feedback equalizer described in the aforementioned U.S. patent application No. 009,973.

Referring now to FIG. 5, a representative graph of the outputs $C_I(t)$ and $C_Q(t)$ is shown on one axis with time on the other axis. The outputs of the synchronization correlators 303 and 305 have signed responses at each clock pulse but none of the responses exceed the established threshold magnitude until a correlation with the predetermined synchronization sequence $a_T(t)$ is realized. As shown, a correlation is found at time $t_d$.

In summary, then, the present invention describes a unique phase coherent method for demodulating a QPSK radio signal that has been subject to a multipath fading radio channel. In order that the equalization for reception of a radio signal subject to Rayleigh and multipath fading be adapted for the channel, a training or synchronization signal is transmitted as one of the vectors of a quadrature phase modulated signal. The random amplitudes and phases of copies of the modulated signal added to the signal by channel multipath are correlated and combined in accordance with a multipath profile signal developed from the synchronization signal. Therefore, while a particular embodiment of the invention has been shown and described, it should be understood that the invention is not limited thereto since modifications unrelated to the true spirit and scope of the invention may be made by those skilled in the art.

It is therefore contemplated to cover the present invention and any and all such modifications by the claims of the present invention.

We claim:

1. A time division multiple access (TDMA) radio system receiver utilizing a synchronizing sequence in an assigned timeslot or message data to adapt a multi-phase demodulator to the finite impulse response of a radio channel during the assigned timeslot, comprising:
   means for correlating a first phase of a received synchronizing sequence to a predetermined sequence to produce a first correlator signal;
   means for correlating a second phase of said received synchronizing sequence to said predetermined sequence to produce a second correlator signal; and
   means for demodulating received message data into at least first phase data and second phase data by correlating a first phase of received message data and a second phase of received message data with said first correlator signal and said second correlator signal and combining the resulting outputs of correlation.

2. A time division multiple access (TDMA) radio system receiver in accordance with claim 1 wherein the synchronizing sequence further comprises a binary phase shift keying (BPSK) signal.

3. A time division multiple access (TDMA) radio system receiver in accordance with claim 1 wherein said means for demodulating further comprises:
   first means for correlating said first phase of received message data with said first correlator signal and said second correlator signal to produce first and second weighted signals, respectively;
   second means for correlating said second phase of received message data with said first correlator signal and said second correlator signal to produce third and fourth weighted signals, respectively; and
   means for adding said first and fourth weighted signals and for subtracting said second weighted signal from said third weighted signal.

4. A time division multiple access (TDMA) quadrature phase modulation receiver which receives a multipath-impaired signal from a radio channel, including a predetermined synchronizing signal portion and a multiphase data signal portion, comprising:
   means for orthogonally separating the received multipath-impaired signal into first and second intermediate signals;
   means for detecting the predetermined synchronizing signal portion from at least one of said first and second intermediate signals;
   means for obtaining first and second radio channel profiles of the radio channel from said detected synchronizing signal portion; and
   means for combining both said obtained radio channel profiles with the multiphase data signal portion of both said first and second intermediate signals to reconstruct phase coherent demodulated quadrature signals.

5. A time division multiple access (TDMA) quadrature phase modulation receiver in accordance with claim 4 wherein the synchronizing signal portion further comprises a binary phase shift keying (BPSK) signal.

6. A time division multiple access (TDMA) radio receiver demodulator which demodulates from a radio channel a multipath-impaired quadrature phase shift keying (QPSK) data signal including a predetermined acquisition sequence and a message in a TDMA timeslot, the radio receiver demodulator comprising:
   means for separating a received data signal into quadrature phase components;
   means for detecting the predetermined acquisition sequence from said quadrature phase components of said received data signal;
   means, responsive to said detected acquisition sequence, for synthesizing at least one multipath profile of the radio channel for each quadrature phase component of the received data signal;
   means, responsive to each multipath profile, for performing multipath correlation of the message in each quadrature phase component to produce pairs of a multipath correlated message for each quadrature phase component; and
   means for summing mutually exclusive pairs of said multipath correlated message.

7. A time division multiple access (TDMA) radio receiver demodulator in accordance with claim 6 wherein the predetermined acquisition sequence further comprises a binary phase shift keying (BPSK) signal.

8. A digital radio receiver which receives and demodulates a time division multi-phase modulated data signal having multiple copies introduced by multipath signal interference on a radio channel, the data signal having a synchronizing signal portion and a message signal portion, the digital radio receiver comprising:

(a) means for separating a received data signal into first and second intermediate signals, each said first and second intermediate signal having a synchronizing signal portion and a message signal portion;

(b) means for detecting a received synchronizing signal, further comprising:
  (1) means for correlating said first intermediate signal synchronizing signal portion to a predetermined signal to produce a first correlator signal, and
  (2) means for correlating said second intermediate signal synchronizing signal portion to said predetermined signal to produce a second correlator signal; and (c) means for demodulating a received message signal with the multiple copies compensated, further comprising:
  (1) means for correlating said first intermediate signal message signal portion with said first correlator signal to produce a first weighted signal,
  (2) means for correlating said first intermediate signal message signal portion with said second correlator signal to produce a second weighted signal,
  (3) means for correlating said second intermediate signal message signal portion with said first correlator signal to produce a third weighted signal,
  (4) means for correlating said second intermediate signal message signal portion with said second correlator signal to produce a fourth weighted signal,
  (5) means for adding said first weighted signal and said fourth weighted signal to produce a demodulated first phase of the multi-phase modulated signal, and
  (6) means for subtracting said second weighted signal from said third weighted signal to produce a demodulated second phase of the multi-phase modulated signal.

9. A digital radio receiver in accordance with claim 8 wherein the synchronizing signal portion further comprises a binary phase shift keying (BPSK) signal.

10. A method of multi-phase demodulation in a time division multiple access (TDMA) radio system receiver utilizing a synchronizing sequence in an assigned timeslot of message data to adapt the multiphase demodulator to the finite impulse response of a radio channel during the assigned timeslot, comprising the steps of:
  correlating a first phase of a received synchronizing sequence to a predetermined sequence to produce a first correlator signal;
  correlating a second phase of said received synchronizing sequence to said predetermined sequence to produce a second correlator signal; and
  demodulating received message data into at least first phase data and second phase data by correlating a first phase of received message data and a second phase of received message data with said first correlator signal and said second correlator signal and combining the resulting outputs of correlation.

11. A method in accordance with the method of claim 10 wherein said demodulating step further comprises the steps of:
  correlating said first phase of received message data with said first correlator signal and said second correlator signal to produce first and second weighted signals, respectively;
  correlating said second phase of received message data with said first correlator signal and said second correlator signal to produce third and fourth weighted signals, respectively; and
  adding said first and fourth weighted signals and subtracting said second weighted signal from said third weighted signal.

12. A method of demodulation for a time division multiple access (TDMA) quadrature phase modulation receiver which receives a multipath-impaired signal from a radio channel, including a predetermined synchronizing signal portion and a multiphase data signal portion, comprising the steps of:
  separating in quadrature the received multipath-impaired signal into first and second intermediate signals;
  detecting the predetermined synchronizing signal portion from at least one of said first and second intermediate signals;
  obtaining first and second radio channel profiles of the radio channel from said detected synchronizing signal portion; and
  combining both said obtained radio channel profiles with the multiphase data signal portion of both said first and second intermediate signals to reconstruct phase coherent demodulated quadrature signals.

13. A method of data signal demodulation in a time division multiple access (TDMA) radio receiver which receives from a radio channel a multipath-impaired quadrature phase shift keying (QPSK) data signal which includes a predetermined acquisition sequence and a message in a TDMA timeslot, comprising the steps of:
  separating a received data signal into quadrature phase components;
  detecting the predetermined acquisition sequence from said quadrature phase components of said received data signal;
  synthesizing, in response to said acquisition sequence detection, at least one multipath profile of the radio channel for each quadrature phase component of the received data signal;
  performing multipath correlation of the message, in response to each multipath profile, in each quadrature phase component to produce pairs of a multipath correlated message for each quadrature phase component; and
  summing mutually exclusive pairs of said multipath correlated message.

14. A method of demodulating a time division multi-phase modulated data signal from a radio channel in a digital radio receiver, the data signal having a synchronizing signal portion and a message signal portion, comprising the steps of:
  (a) separating a received data signal into first and second intermediate signals, each said first and second intermediate signal having a synchronizing signal portion and a message signal portion;
  (b) detecting a received synchronizing signal, further comprising the steps of:
    (1) correlating said first intermediate signal synchronizing signal portion to a predetermined signal to produce a first correlator signal, and
    (2) correlating said second intermediate signal synchronizing signal portion to said predetermined signal to produce a second correlator signal; and
  (c) demodulating a received message signal, further comprising the steps of:

(1) correlating said first intermediate signal message signal portion with said first correlator signal to produce a first weighted signal,
(2) correlating said first intermediate signal message signal portion with said second correlator signal to produce a second weighted signal,
(3) correlating said second intermediate signal message signal portion with said first correlator signal to produce a third weighted signal,
(4) correlating said second intermediate signal message signal portion with said correlator signal to produce a fourth weighted signal,
(5) adding said first weighted signal and said fourth weighted signal to produce a demodulated first phase of the multi-phase modulated signal, and
(6) subtracting said second weighted signal from said third weighted signal to produce a demodulated second phase of the multi-phase modulated signal.

* * * * *